(12) United States Patent
Chen et al.

(10) Patent No.: US 7,369,403 B2
(45) Date of Patent: May 6, 2008

(54) MOUNTING APPARATUS FOR SECURING STORAGE DEVICE

(75) Inventors: Yun-Lung Chen, Tu-Cheng (TW); Wu Long, Shenzhen (CN); Fa-Ming Jiang, Shenzhen (CN); Gang Su, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 365 days.

(21) Appl. No.: 11/153,559

(22) Filed: Jun. 14, 2005

(65) Prior Publication Data

US 2006/0126288 A1    Jun. 15, 2006

(30) Foreign Application Priority Data

Dec. 11, 2004    (CN) .................... 2004 2 0102739

(51) Int. Cl.
G06F 1/16         (2006.01)
H05K 5/00         (2006.01)
H05K 7/00         (2006.01)

(52) U.S. Cl. ..................... 361/685; 361/683

(58) Field of Classification Search ............... 361/685, 361/683; 312/223.1, 223.2; 248/223.41, 248/300

See application file for complete search history.

(56) References Cited

U.S. PATENT DOCUMENTS

| | | | |
|---|---|---|---|
| 4,979,909 A | 12/1990 | Andrews | 439/352 |
| 6,625,014 B1 | 9/2003 | Tucker et al. | 361/685 |
| 7,180,734 B2* | 2/2007 | Jing | 361/685 |
| 2003/0222555 A1* | 12/2003 | Mansueto | 312/330.1 |
| 2004/0037049 A1* | 2/2004 | Erickson et al. | 361/726 |
| 2005/0040306 A1* | 2/2005 | Chen et al. | 248/298.1 |
| 2005/0190535 A1* | 9/2005 | Peng et al. | 361/685 |

* cited by examiner

Primary Examiner—Kimberly D. Nguyen
Assistant Examiner—Nidhi Desai
(74) Attorney, Agent, or Firm—Morris Manning Martin LLP; Tim Tingkang Xia, Esq.

(57) ABSTRACT

A mounting apparatus for securing a storage device (50) with a mounting hole (522) defined therein includes a bracket (20) for receiving the storage device, an operating member (40), a fastening member (30) and a resilient member (60) compressed by the fastening member. A through opening (248) is defined in the bracket. The operating member movably engages with the bracket includes a pressing portion. The fastening member pivotably attaches to the bracket includes a locking portion. The locking portion extends through the through opening of the bracket and engages in the mounting hole of the storage device under the pressure of the pressing portion of the operating member. When the operating member is pulled off, the resilient member rebounds to rotate the locking portion, thereby disengaging the locking portion from the mounting hole of the storage device.

20 Claims, 8 Drawing Sheets

MOUNTING APPARATUS FOR SECURING STORAGE DEVICE

BACKGROUND OF THE INVENTION

1. Field of the Invention

The present invention relates to mounting apparatuses, and more particularly to a mounting apparatus for conveniently securing storage device into a computer enclosure and later removing therefrom.

2. Background of the Invention

Usually, a storage device, such as hard disk is simply screwed to a bracket of a computer enclosure. This conventional mounting means substantially wastes the time, and thus adds the complexity and difficulty of assembling the storage device to the computer enclosure and later disassembling therefrom.

An apparatus is disclosed for removing mass storage devices from a internal support frame in a computer system. The support frame defines a plurality of openings in side walls. The apparatus has resilient, side-mounted engagement members adapted for receipt in openings of the support frame to lock the storage device in position. To remove the storage device, a rotatable lever is connected to one side wall of the support frame. The lever includes one projection member positioned adjacent the opening through the side wall to which the lever is connected. To remove the storage device from the support frame, the lever is rotated so that the projection member contacts the engagement member. Continued rotation of the lever causes the engagement member to be urged inwardly and out of the opening in the side wall. As a result, the storage device is unlocked from the frame. This mounting means described above is convenient to secure the storage device. However, the side-mounted engagement members increase gaps between the storage device and the side wall of the support frame which increases the leakiness of EMI (electro magnetic interference).

What is needed, therefore, is a mounting apparatus for securing conveniently a storage device to a computer chassis and facilitating to prevent the leakiness of EMI.

SUMMARY

A mounting apparatus for securing a storage device with a mounting hole defined therein includes a bracket for receiving the storage device, an operating member, a fastening member and a resilient member compressed by the fastening member. A through opening is defined in the bracket. The operating member movably engages with the bracket includes a pressing portion. The fastening member pivotably attaches to the bracket includes a locking portion. The locking portion extends through the through opening of the bracket and engages in the mounting hole of the storage device under the pressure of the pressing portion of the operating member. When the operating member is pulled off, the resilient member rebounds to rotate the locking portion, thereby disengaging the locking portion from the mounting hole of the storage device.

Advantages and novel features of the present invention will be drawn from the following detailed description of preferred embodiment with attached drawings, in which:

DETAIL DESCRIPTION OF PREFERRED EMBODIMENT

Figure 1:
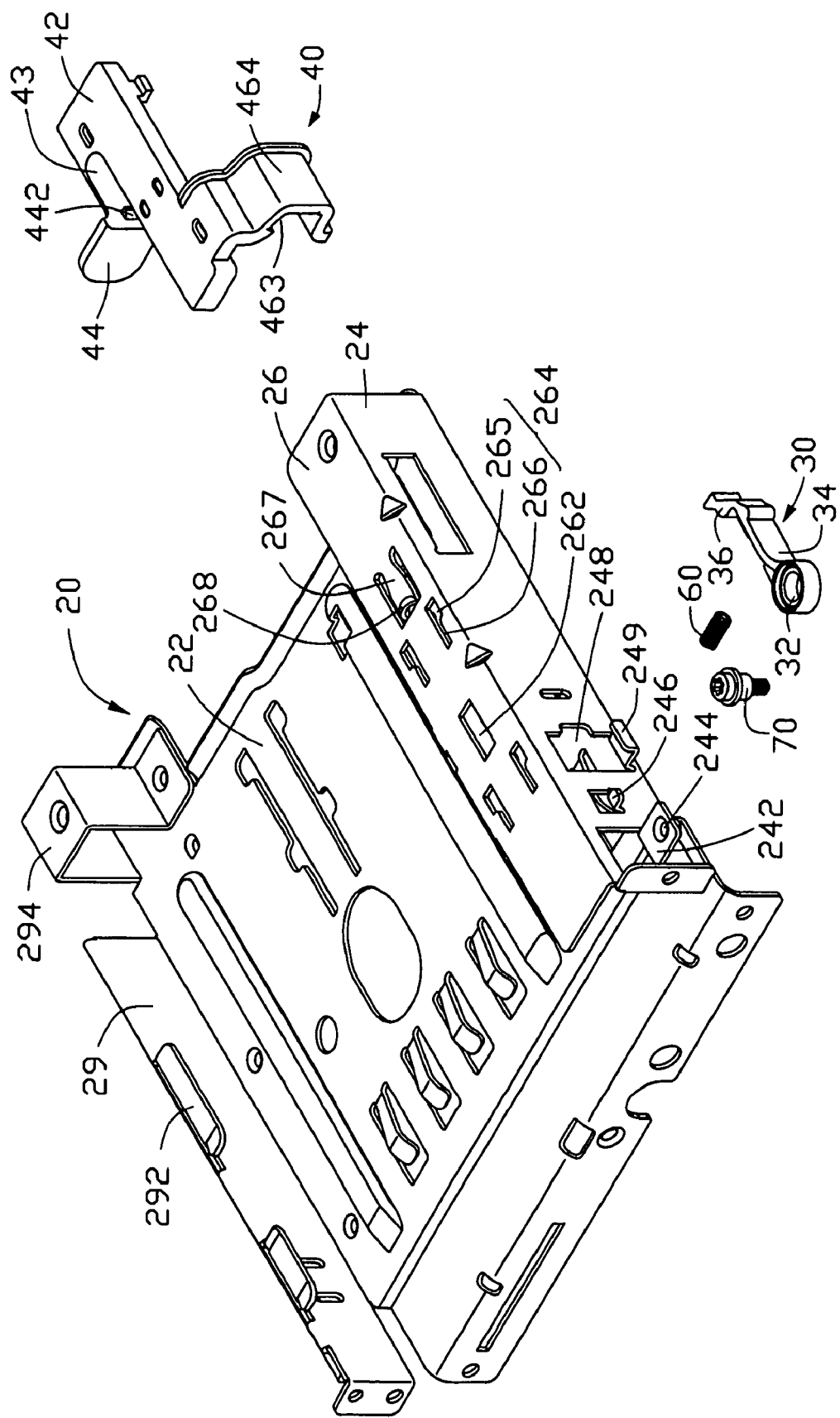
FIG. 1 is an exploded, isometric view of a mounting apparatus of a preferred embodiment of the present invention, the mounting apparatus including a bracket, a fastening member, an operating member and a spring.
Figure 5:
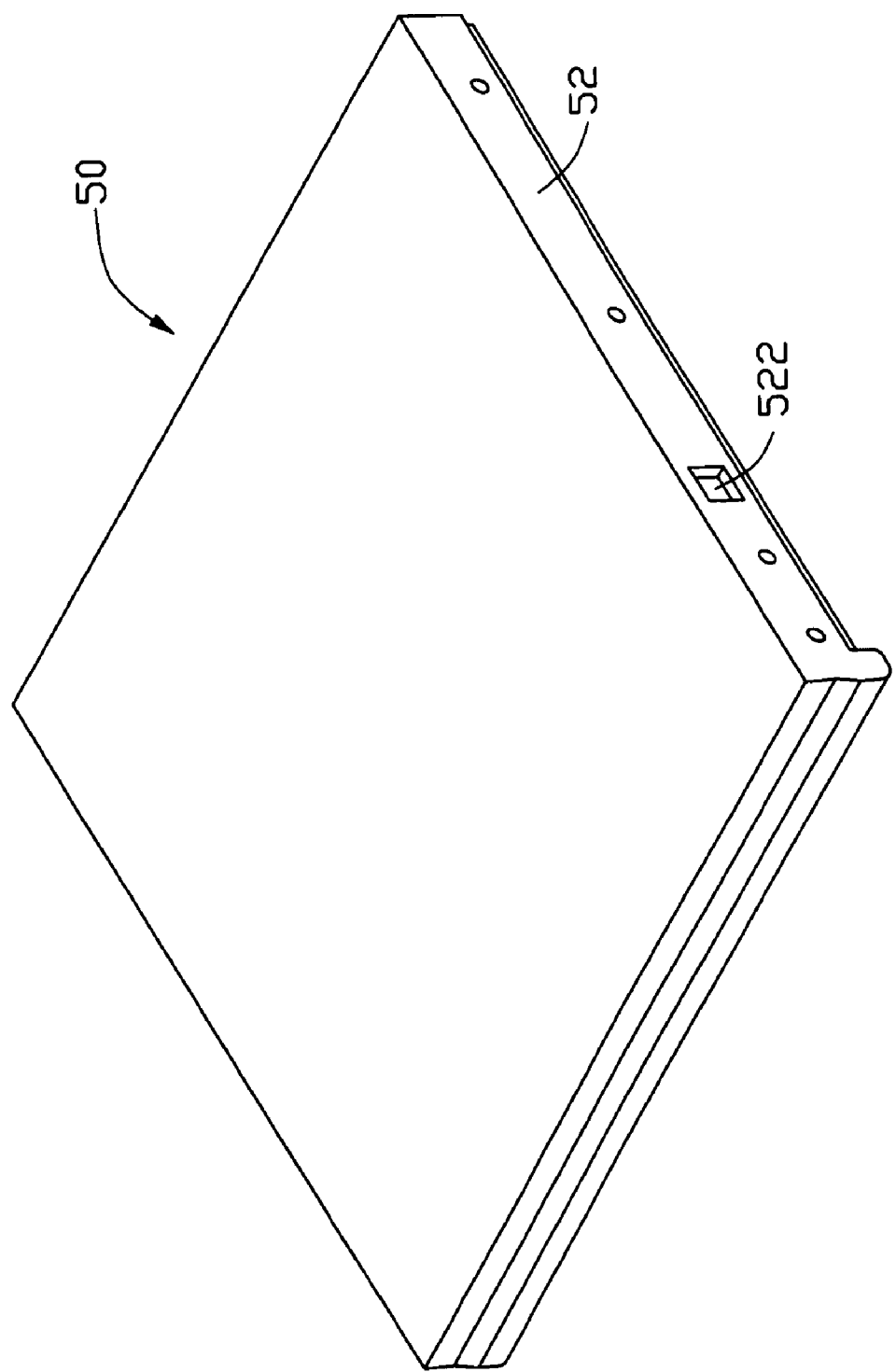
FIG. 5 is an isometric view of a storage device.

Referring to FIGS. 1 and 5, a mounting apparatus is used to secure a storage device 50 to a chassis (not shown) of a computer system. The storage device 50 includes a side wall 52 with a mounting hole 522 defined therein. The mounting apparatus includes a bracket 20 mounted to the chassis, a fastening member 30, an operating member 40 and a resilient member such as a spring 60.

Figure 2:
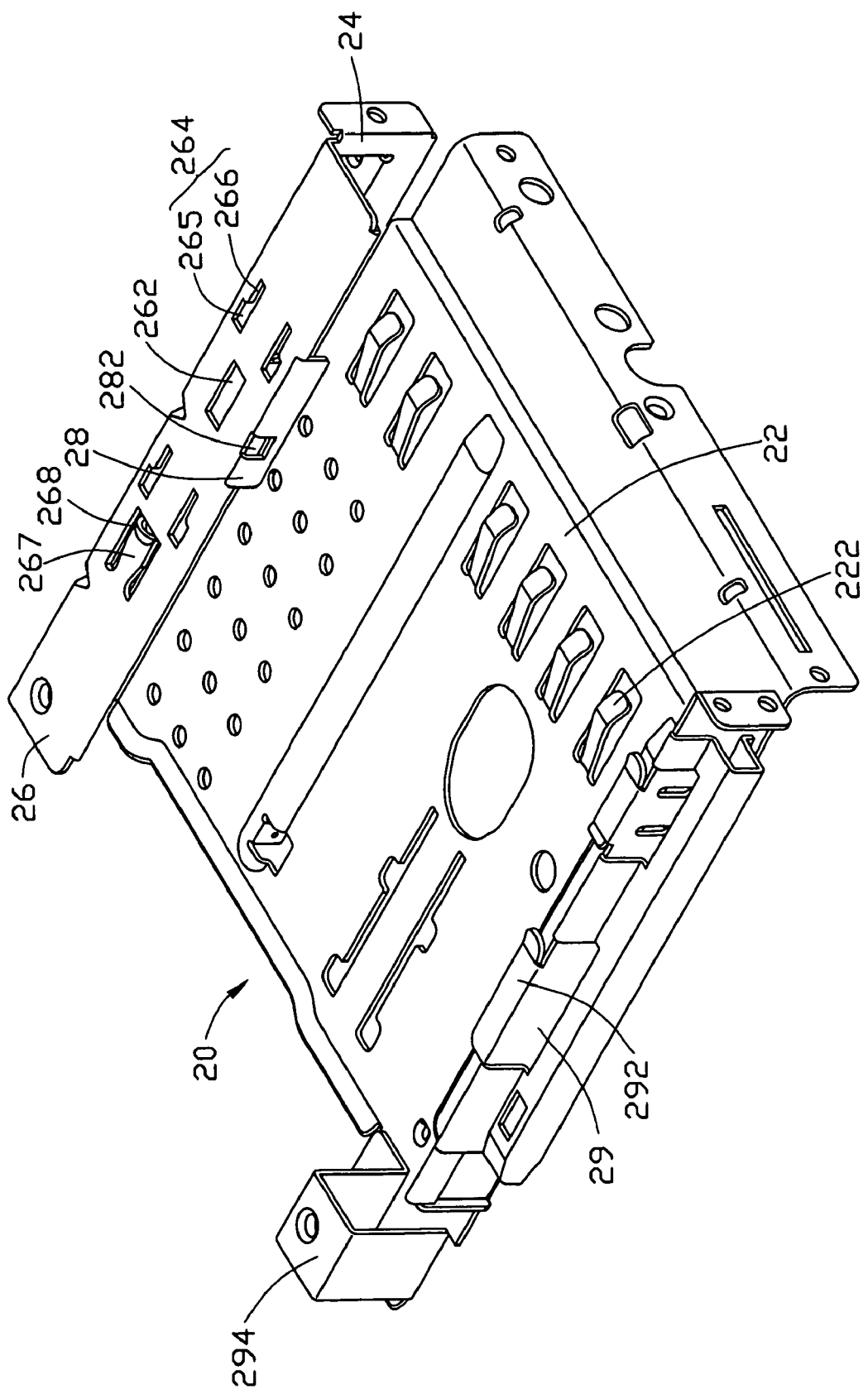
FIG. 2 is another isometric view of the bracket.

Referring also to FIG. 2, the bracket 20 includes a bottom plate 22, a pair of side plates 24, 29 perpendicularly extending upward from opposite edges of the bottom plate 22 and a top plate 26 horizontally extending inward from a top edge of the side plate 24. A mounting clip 242 is formed outward at a front end of the side plate 24 by stamping. A screw hole 244 is defined therein for engaging with a fastener, such as a screw 70. A positioning tab 246 for positioning the spring 60 protrudes perpendicularly from the side plate 24 adjacent to the mounting clip 242. A through opening 248 is defined in the side plate 24 behind the positioning tab 246. An L-shaped projecting clip 249 extends outwardly from a bottom edge of the through opening 248.

A plurality of L-shaped guiding slots 264 is defined in the top plate 26, each having a wide portion 265 and a narrow portion 266. A rectangular slot 262 is defined among the guiding slots 264. A finger clip 267 is formed at a back side of the guiding slots 264 by stamping. The finger clip 267 has a positioning portion 268 at a free end. A vertical plate 28 bends downwardly from a free edge of the top plate 26. A securing opening 282 is defined in the vertical plate 28. A plurality of positioning clip 292 bends perpendicularly from a top edge of the side plate 29 and a restricting portion 294 is formed at a back end of the side plate 29. A plurality of resilient clip 222 is formed at the bottom plate 22 by stamping.

Figure 3:
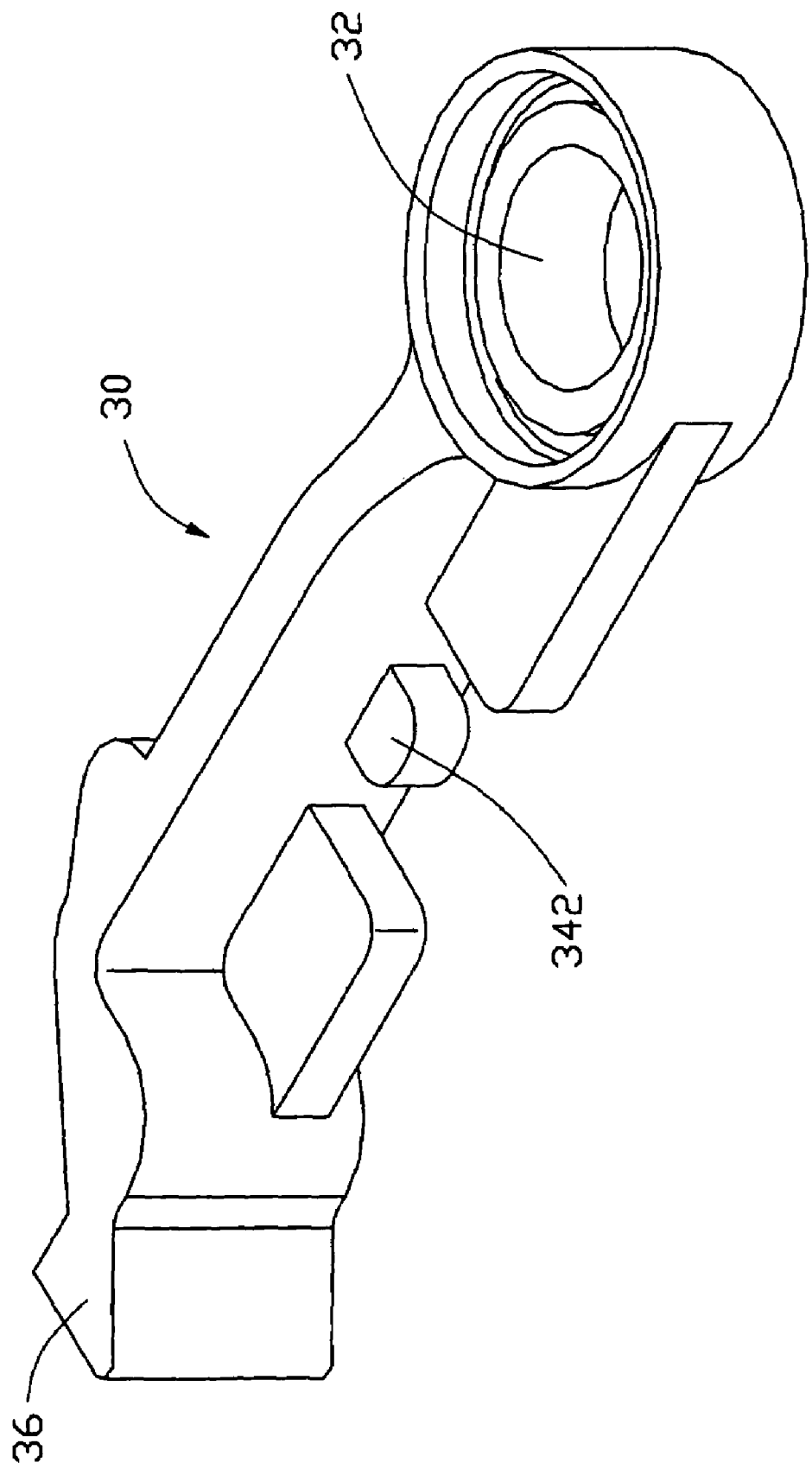
FIG. 3 is an enlarged view of the fastening member and showing from another aspect.

Referring also to FIG. 3, the fastening member 30 is pivotably mounted on the mounting clip 242 of the side plate 24 of the bracket 20. A locking portion 36 extends aslant from an end of the fastening member 30 for engaging in the mounting hole 522 of the storage device 50 via the through hole 248. A pivot hole 32 is defined in the fastening member 30 for receiving the screw 70. A positioning tab 342 protrudes from a middle portion 34 of the fastening member 30 towards the side plate 24 for securing the spring 60.

Figure 4:
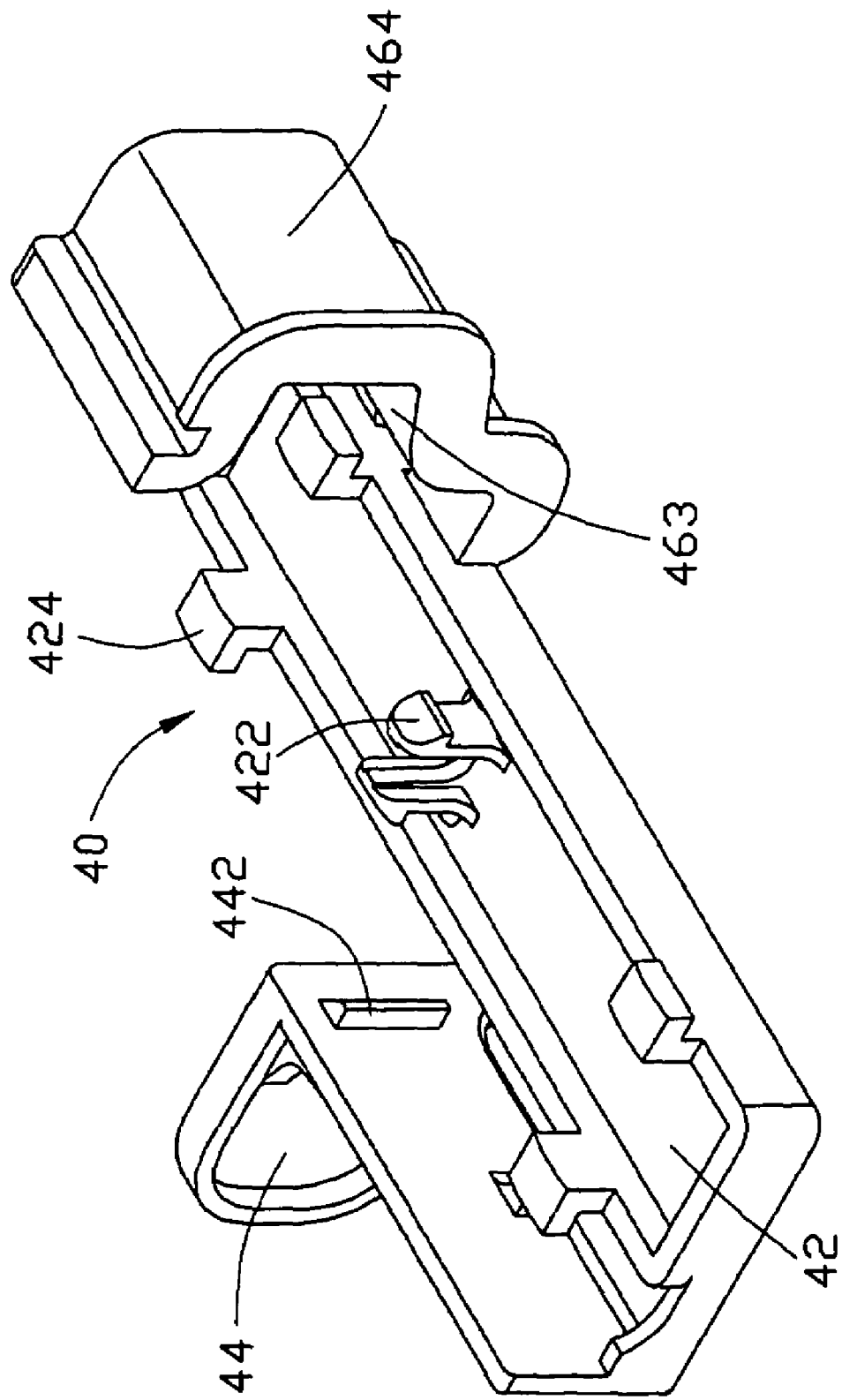
FIG. 4 is another isometric view of the operating member.

Referring to FIGS. 1 and 4, the operating member 40 comprises a main body 42 and an operating portion 44 formed at a side thereof. A gap 43 is defined between the main body 42 and the operating portion 44 for facilitating resilient deformation of the operating portion 44. Two pairs of L-shaped sliding tabs 424, corresponding to the guiding slots 264 of the top plate 26 of the bracket 20, protrude from the main body 42. A pair of hook portions 422, corresponding to the rectangular slot 262 of the top plate 26 of the bracket 20, projects from a middle of the main body 42. A pressing portion 464 is formed at an end opposite to the operating portion 44. A substantially rectangular slot 463 is defined in the pressing portion 464 for holding the locking portion 36 of the fastening member 30. A wedge-shaped securing protrusion 442 is formed at a surface towards the main body 42 for engaging in the securing opening 282 of the bracket 20.

Figure 6:
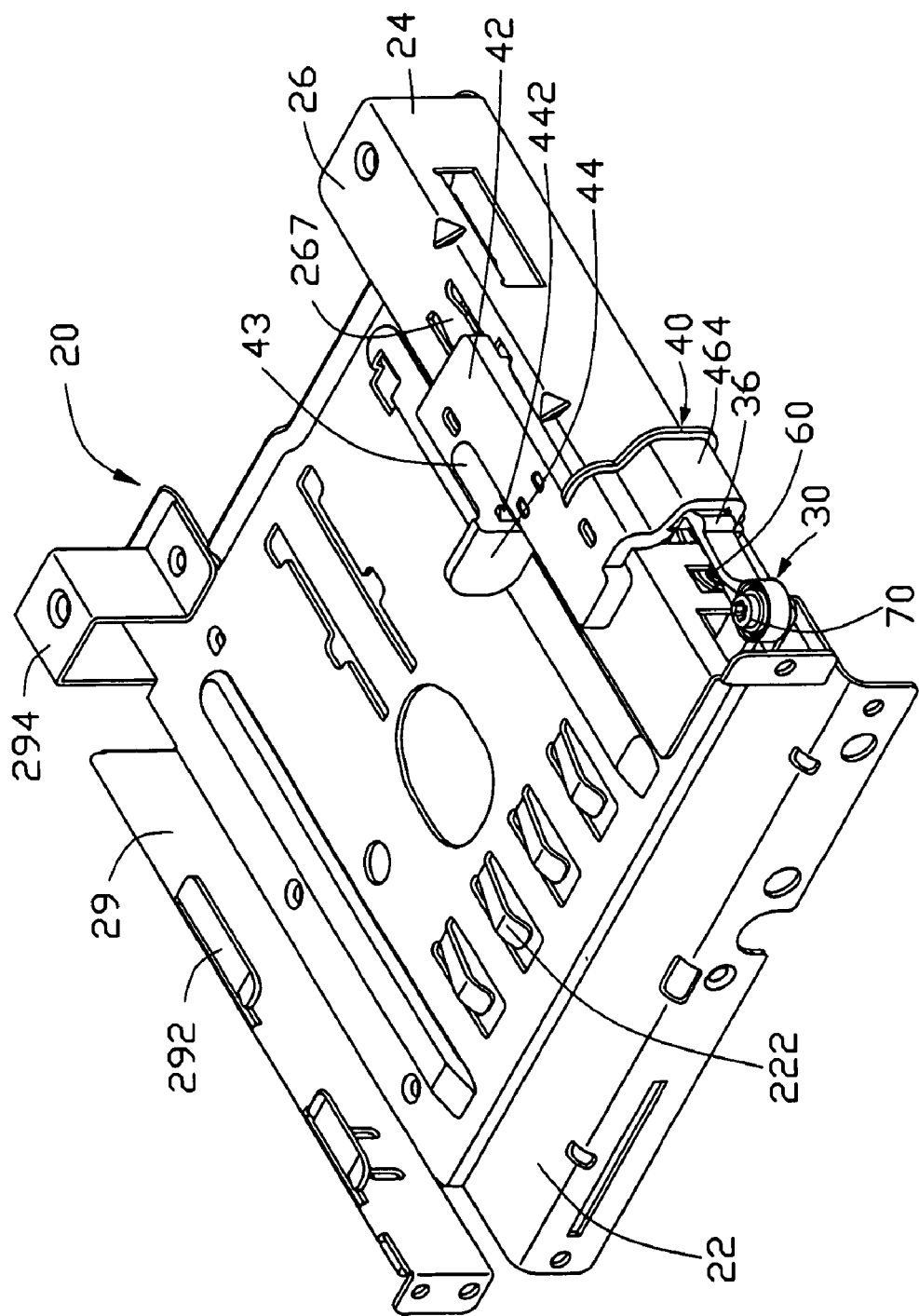
FIG. 6 is an assembly view of FIG. 1, and showing the operating member in a unlocked position.

Referring also to FIG. 6, in assembly, the bracket 20 is firstly mounted on the chassis of the computer system. The fastening member 30 is pivotably screwed to the mounting clip 242 of the side plate 24 of the bracket 20 with screw 70. The spring 60 is secured on the positioning tabs 246, 342 between the fastening member 30 and the side plate 24 of the bracket 20. The operating member 40 is lowered to insert the sliding tabs 424 and the hook portions 422 into wide portions 265 of the guiding slots 264 and the rectangular slot 262 respectively. The finger clip 267 is pressed under the main body 42 of the operating member 40 and thus elastically deforms downwardly. The pressing portion 464 of the operating member 40 is placed on the projecting clip 249 of the side plate 24. The fastening member 30 is then pivoted towards the side plate 24, and the operating member 40 is pushed to slide towards a front edge of the top plate 26. When the operating member 40 slides over the finger clip 267, the finger clip 267 is released. The positioning portion 268 at the free end of the finger clip 267 rebounds to block removal of the operating member 40 reversely. The sliding tabs 424 of the operating member 40 slide to the narrow portions 266 of guiding slots 264. The operating member 40 is thus slidably mounted on the bracket 20. The locking portion 36 of the fastening member 30 is received in the slot 463 of the pressing portion 464 of the operating member 40.

Figure 7:
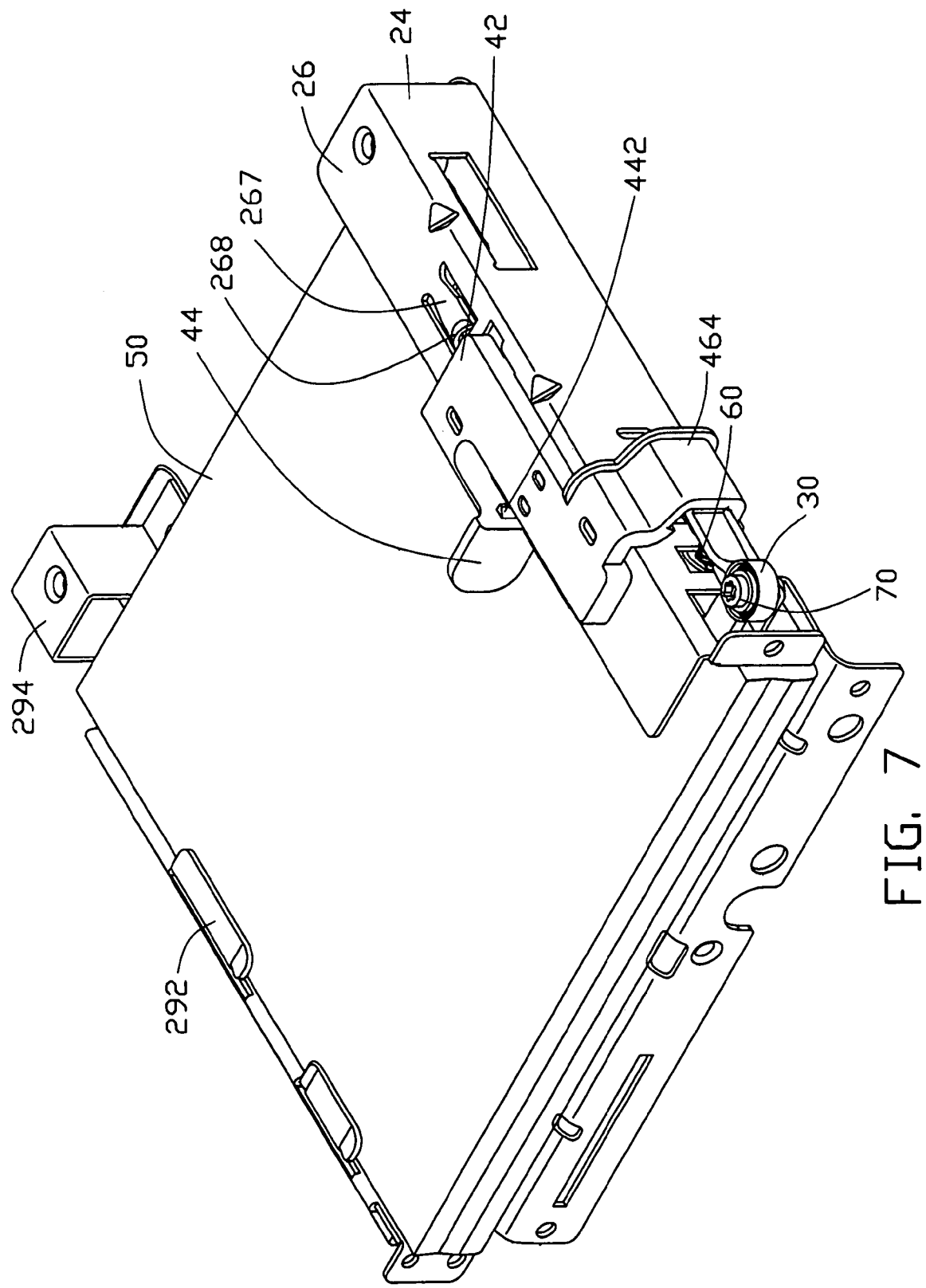
FIG. 7 is similar to FIG. 6, but showing the storage device installed into the bracket.
Figure 8:
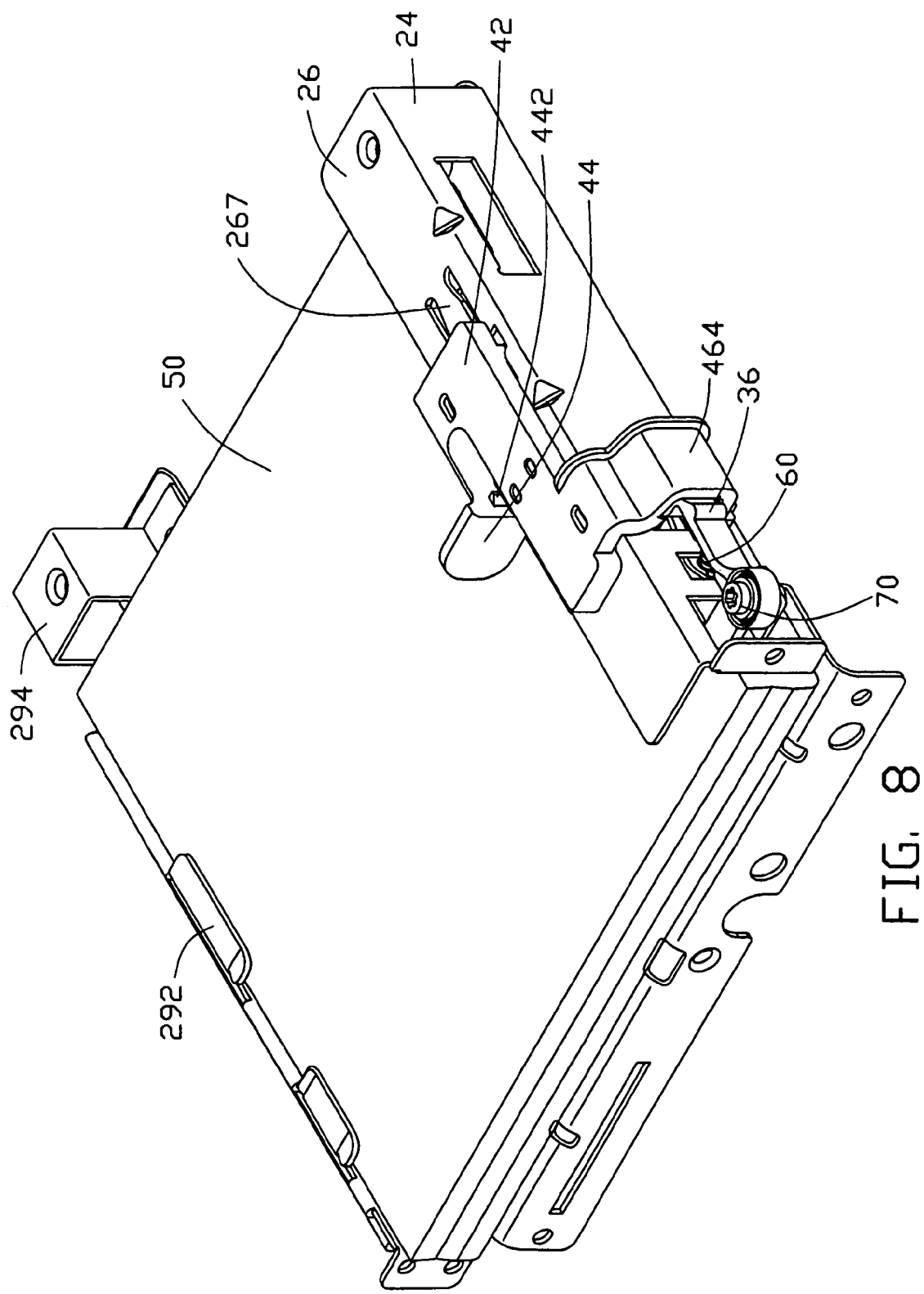
FIG. 8 is similar to FIG. 7, but showing the operating member in a locked position.

Referring also to FIGS. 7 and 8, in installing the storage device 50, the operating member 40 is in a unlocked position in which the positioning portion 268 of the finger clip 267 abuts the operating member 40. The storage device 50 is slid into the bracket 20 until the restricting portion 294 blocks the storage device 50. The mounting hole 522 aligns with the through opening 248 of the side plate 24. The operating member 40 is pushed to slide towards the front edge of the top plate 26. As the pressing portion 464 receives the locking portion 36 of the fastening member 30 further, the fastening member 30 is pivoted towards the side plate 24. The spring 60 is compressed by the fastening member 30. When the locking portion 36 inserts through the through opening 248 and engages into the mounting hole 522 of the storage device 50, the operating member 40 is in a locked position in which the securing protrusion 442 of the operating portion 44 engages in the securing opening 282 of the bracket 20. The storage device 50 is thus mounted in the bracket 20.

In removing the storage device 50, the operating portion 44 is pulled to disengage the securing protrusion 442 from the securing opening 282. The operating member 40 is then moved reversely. The pressing portion 464 gradually releases the locking portion 36. The spring 60 rebounds to drive the fastening member 30 to rotate outward. When the operating member 40 is in the unlocked position, the locking portion 36 disengages from the mounting hole 522 of the storage device 50. The storage device 50 can thus be removed from the bracket 20.

In another alternative embodiment, the fastening member 30 is a resilient clip formed at the side plate 24 having locking portion at a free end for engaging in the mounting hole 522 of the storage device 50, and the spring 60 is omitted.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A mounting apparatus for securing a storage device with a mounting hole defined therein, comprising:
   a bracket for receiving the storage device, a through opening being defined in the bracket;
   an operating member movably engaged with the bracket comprising a pressing portion;
   a fastening member pivotably attached to the bracket, comprising a locking portion, the locking portion extending through the through opening of the bracket and engaging in the mounting hole of the storage device under the pressure of the pressing portion of the operating member; and
   a resilient member compressed by the fastening member; whereby
   when the operating member is pulled off, the resilient member rebounds to rotate the locking portion, thereby disengaging the locking portion from the mounting hole of the storage device.

2. The mounting apparatus as described in claim 1, wherein the locking portion extends aslant from a free end of the fastening member towards the bracket.

3. The mounting apparatus as described in claim 1, wherein a slot is defined in the pressing portion of the operating member for receiving the locking portion of the fastening member.

4. The mounting apparatus as described in claim 1, wherein the resilient member is connected between the fastening member and the bracket.

5. The mounting apparatus as described in claim 1, wherein a securing protrusion projects from the operating member, and a securing opening is defined in the bracket for engaging with the securing protrusion.

6. The mounting apparatus as described in claim 5, wherein the operating member further comprises an operating portion for pulling the operating member thereby, and the securing protrusion projects therefrom.

7. A mounting apparatus for securing a storage device with a mounting hole defined therein, comprising:
   a bracket for receiving the storage device, the bracket defining a securing opening therein;
   a fastening member pivotably attached to the bracket for engaging in the mounting hole of the storage device; and
   an operating member slidably disposed on the bracket comprising a securing protrusion for engaging in the securing opening of the bracket; whereby
   when the securing protrusion engages in the securing opening, the operating member drives the fastening member to engage in the mounting hole of the storage device.

8. The mounting apparatus as described in claim 7, wherein the operating member further comprising an operating portion for pulling the operating member thereby, and the securing protrusion projects therefrom.

9. The mounting apparatus as described in claim 7, wherein a through opening is defined in the bracket for the locking portion extending therethrough to engage in the mounting hole of the storage device.

10. The mounting apparatus as described in claim 9, wherein a locking portion extends aslant from a free end of the fastening member towards the bracket, and the operating member comprising a pressing portion for driving the locking portion to engage in the mounting hole of the storage device via the through opening.

11. The mounting apparatus as described in claim 10, wherein a slot is defined in the pressing portion of the operating member for receiving the locking portion of the fastening member.

12. The mounting apparatus as described in claim 7, further comprising a resilient member for urging the fastening member to rotate outward.

13. The mounting apparatus as described in claim 12, wherein the resilient member is sandwiched between the fastening member and the bracket.

14. A computer system comprising:
   a bracket adapted to have a storage device of the computer system being movably receivable therein;
   an operating member movably attachable to the bracket between a locked position and an unlocked position thereof along a direction parallel to a moving direction of the storage device into the bracket; and
   a fastening member movably attached to the bracket, and comprising a locking portion controllable by the operating member to be resiliently reachable to the storage device in order for securing the storage device in the bracket when the operating member is in the locked position, and to be unreachable to the storage device in order for releasing the storage device to be movable away from the bracket when the operating member is in the unlocked position;
   wherein a finger clip is formed at the bracket to prevent the operating member being removed from the bracket.

15. The computer system as described in claim 14, wherein a through opening is defined in the bracket for the locking portion extending therethrough to engage in a mounting hole of the storage device.

16. The computer system as described in claim 14, further comprising a resilient member attached to the bracket at one end and to the fastening member at the other end, and urging the locking portion to be away from the storage device when the operating member is in the unlocked position.

17. The computer system as described in claim 14, wherein the bracket defines a slot therein, a portion formed on the operating member is insertable into the bracket via the slot of the bracket for thereby movably attaching the operating member to the bracket.

18. The computer system as described in claim 17, wherein the portion of the operating member is an L-shaped tab, the slot comprises a wide portion for the tab inserting therethrough, and a narrow portion communicating with the wide portion for receiving the tab sliding therein for retaining the operating member to the bracket.

19. The computer system as described in claim 14, wherein a securing means for locating the operating member in the locked position is formed in the bracket.

20. The computer system as described in claim 19, wherein the securing means comprises a securing protrusion projecting from the operating member and a securing opening defined in the bracket for receiving the securing protrusion.

* * * * *